United States Patent [19]
Ehrhart et al.

[11] Patent Number: 4,793,129
[45] Date of Patent: Dec. 27, 1988

[54] INVERSION CHUTE FOR WINDROW TURNER

[75] Inventors: Philip J. Ehrhart, Narvon, Pa.; Gilbert A. Cartee, Holtville, Calif.; Ernest A. Schoeneberger, New Holland, Pa.

[73] Assignee: Ford New Holland, Inc., New Holland, Pa.

[21] Appl. No.: 99,828

[22] Filed: Sep. 23, 1987

[51] Int. Cl.⁴ .......................................... A01D 78/00
[52] U.S. Cl. ..................................................... 56/370
[58] Field of Search ................... 56/14.8, 16.4, 182, 56/184, 185, 189, 190, 192, 228, 365, 366, 369, 370, 373, 375, 376, 377, 378

[56] References Cited

U.S. PATENT DOCUMENTS

| | | | |
|---|---|---|---|
| 2,352,479 | 6/1944 | Huddle | 56/228 |
| 2,391,427 | 12/1945 | Kucera . | |
| 2,529,577 | 11/1950 | Schempp et al. . | |
| 2,609,651 | 9/1952 | Cymara . | |
| 2,629,223 | 2/1953 | Russell | 56/376 |
| 2,636,335 | 4/1953 | Whitney . | |
| 2,727,350 | 12/1955 | Kullman | 56/376 |
| 2,751,745 | 6/1956 | Magee | 56/372 |
| 3,110,146 | 11/1963 | Latshaw | 56/228 |
| 3,496,713 | 2/1970 | Reinhardt et al. . | |
| 3,884,022 | 5/1975 | Landolt . | |

FOREIGN PATENT DOCUMENTS

| | | | |
|---|---|---|---|
| 467818 | 9/1950 | Canada | 56/192 |
| 974388 | 2/1951 | France | 56/DIG. 21 |
| 1101716 | 10/1955 | France | 56/192 |

Primary Examiner—John Weiss
Attorney, Agent, or Firm—Larry W. Miller; Frank A. Seemar; Darrell F. Marquette

[57] ABSTRACT

An inversion chute for use on a windrow turner having a pickup mechanism for elevating a windrow of crop material off the ground and a cross conveyor for receiving the elevated windrow and conveying the windrow laterally of the direction of travel is disclosed wherein the inversion chute is telescopically mounted in a mounting sleeve to permit lateral adjustment thereof relative to the discharge end of the cross conveyor. The inversion chute is also pivotally mounted on the frame of the windrow turner for movement between an operating position adjacent to and laterally outboard of the cross conveyor and a transport position rearwardly of the pickup and cross conveyor. An overcenter biasing spring retains the inversion chute in its selected position.

13 Claims, 2 Drawing Sheets

INVERSION CHUTE FOR WINDROW TURNER

BACKGROUND OF THE INVENTION

The present invention relates generally to an apparatus for inverting and laterally displacing windrows of crop material on the ground and, more particularly, to an improved inversion chute for use in conjunction with a cross conveyor to effect an inversion of the windrow of crop material upon discharge thereof to the ground.

Many different types of apparatus for working windrows of crop material have been found in the prior art. One device utilizes a rotating tine pickup to elevate the windrow off the ground whereupon a carrousel type conveyor rotates the windrow in a circular path to tumble the windrow forwardly off the edge of the carrousel table to invert the windrow. Other devices utilize pickup mechanisms to elevate the windrow into an involute chute whereupon gravity urges the windrow back to the ground. Still other devices merely elevate the windrow and shift it laterally to be dumped directly upon the ground.

Proper inversion of a windrow of crop material by a machine utilizing a rotating tine pickup mechanism to elevate the windrow of crop material onto an endless draper cross conveyor operable to convey the windrow laterally of the direction of travel would require the use of an inversion chute to receive the windrow of crop material from the cross conveyor and redirect it into a forward orientation for discharge to the ground in an inverted state. None of the known prior art devices utilize an inversion chute cooperable with an endless draper cross conveyor and which is positionally adjustable to accommodate differing crop conditions. In addition, any inversion chute extending laterally of a cross conveyor would increase the overall width of the machine, which may be beyond that permitted for transport thereof over public highways.

SUMMARY OF THE INVENTION

It is an object of this invention to overcome the aforementioned disadvantages of the prior art by providing an inversion chute which is positionally adjustable to accommodate different crop conditions.

It is another object of this invention to mount the inversion chute on the frame of a windrow turner so as to be repositionable between operating and transport positions.

It is an advantage of this invention that the overall transport width of the windrow turner can be minimized by moving the inversion chute into a transport position longitudinally of the pickup mechanism.

It is a feature of this invention that the inversion chute can be pivotally moved between operating and transport positions.

It is another feature of this invention that an overcenter spring can be utilized to maintain the inversion chute in its selected position.

It is still another feature of this invention that the inversion chute can be selectively laterally positioned in a plurality of positions relative to the lateral discharge end of the cross conveyor.

It is another advantage of this invention that the inversion chute can be positionally adjusted relative to the discharge end of the cross conveyor to accommodate different sizes of windrows.

It is still another object of this invention to provide a means for adjusting the position of the inversion chute relative to the cross conveyor without changing the angular relationship between the discharge edge of the inversion chute relative to the centerline of the cross conveyor.

It is yet another object of this invention to provide an inversion chute for a windrow turner that effects an inversion of a windrow of crop material while maintaining the basic windrow integrity and minimizing crop damage.

It is yet another feature of this invention that an impact between the inversion chute and an obstacle could pivotally rotate the inversion chute toward its transport position to minimize damage thereof.

It is a further object of this invention to provide an inversion chute for a windrow turner which is durable in construction, inexpensive of manufacture, carefree of maintenance, facile in assemblage, and simple and effective in use.

These and other objects, features and advantages are accomplished according to the instant invention by providing an inversion chute for use on a windrow turner having a pickup mechanism for elevating a windrow of crop material off the ground and a cross conveyor for receiving the elevated windrow and conveying the windrow laterally of the direction of travel wherein the inversion chute is telescopically mounted in a mounting sleeve to permit lateral adjustment thereof relative to the discharge end of the cross conveyor. The inversion chute is also pivotally mounted on the frame of the windrow turner for movement between an operating position adjacent to and laterally outboard of the cross conveyor and a transport position rearwardly of the pickup and cross conveyor. An overcenter biasing spring retains the inversion chute in its selected position.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
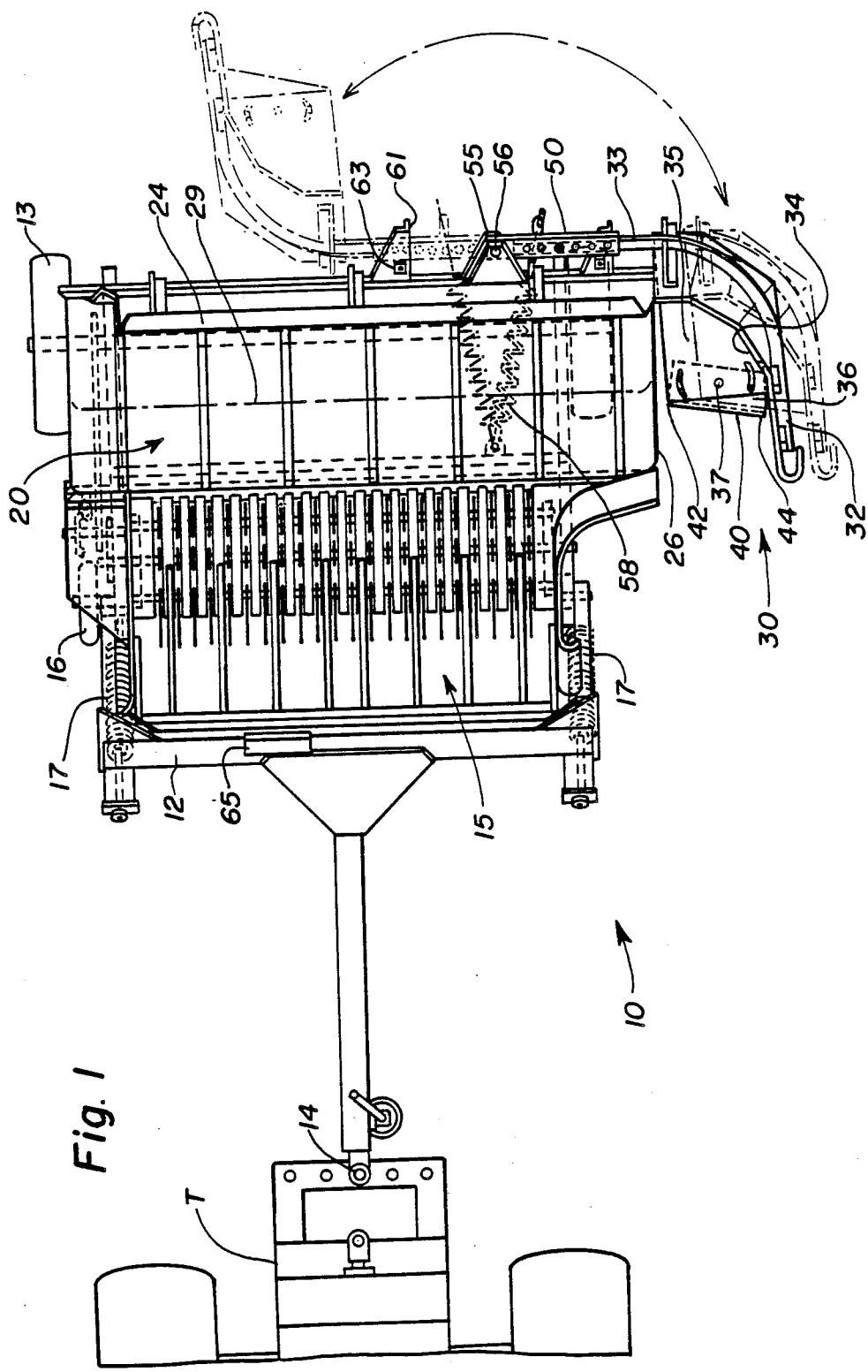
FIG. 1 is a top plan view of a windrow turner having a inversion chute positioned laterally of the draper cross conveyor, the telescopic positioning of the inversion chute being shown in phantom laterally of the cross conveyor while the pivoted transport position of the inversion chute is shown in phantom rearwardly of the cross conveyor.

Referring now to the drawings and, particularly, to FIG. 1, a top plan view of a machine for inverting and laterally displacing a windrow of crop material, commonly referred to as a windrow turner, can be seen.

Any left and right references are used as a matter of convenience and are determined by standing at the rear of the machine, facing the forward end, looking in the direction of travel. The windrow turner 10 is a pull-type implement having a frame 12 provided with ground engaging wheels 13 and a hitch member 14 to permit connection thereof to a prime mover, such as a tractor T.

The windrow turner 10 is provided with a rotating tine pickup mechanism 15 operable to engage a windrow of crop material on the ground and elevate the windrow onto a rearwardly positioned cross conveyor 20. The pickup mechanism 15 is provided with at least one gauge wheel 16 adjustably positionable to vary the relative position of the pickup mechanism 15 with the ground. Flotation springs 17 minimize the weight of the pickup 15 on the gauge wheel 16 to permit the pickup 15 to more easily follow changing ground contours.

The cross conveyor 20 is shown to be of the endless draper type entrained around longtudinally extending laterally spaced rollers 22 to form a conveying mechanism to transport the elevated windrow of crop material laterally of the direction of travel. An upright wall 24 positioned immediately rearwardly of the cross conveyor 20 prevents the windrow from passing rearwardly beyond the cross conveyor and maintains the windrow on the conveyor 20 to assist the lateral conveyance thereof.

An inversion chute 30 is positioned adjacent the left discharge end 26 of the cross conveyor 20 to receive the windrow being conveyed thereon. The inversion chute 30 is provided with a subframe 32, including a transversely extending mounting arm 33, supporting a generally upright diversion wall 34 extending generally arcuately from a transverse orientation proximate to the upright wall 24 to a forwardly extending orientation laterally opposite the discharge end 26 of the cross conveyor 20. The inversion chute 30 is also provided with a floor base member 35 contiguous to the diversion wall 34 below the cross conveyor 20 and angled downwardly from rear to front. The floor base member 35 is provided with an edge plate member 36 pivotable about an axis 37 and fixed into position relative to the floor base member 35 by clamping bolts 38. The edge plate member 36 defines a discharge edge 40 for the floor base member 35 over which the windrow of crop material is passed before being discharged to the ground.

Figure 2:
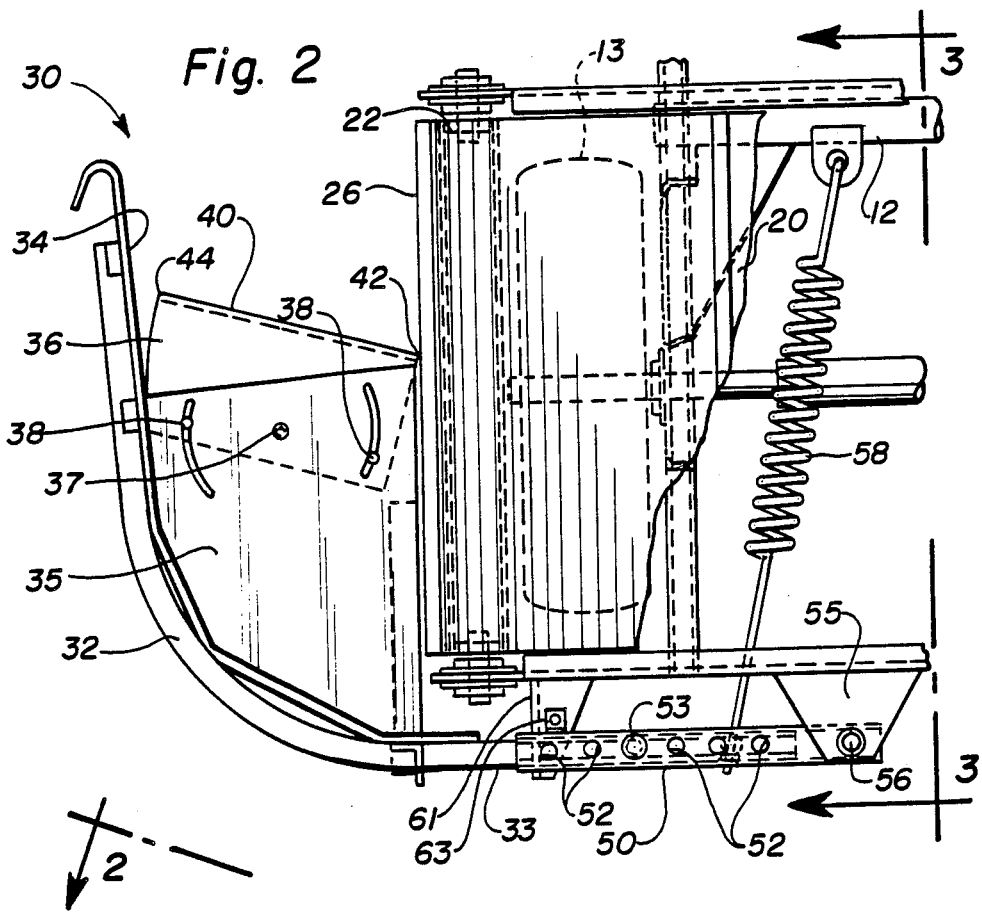
FIG. 2 is an enlarged detail plan view of a portion of the windrow turner corresponding to the discharge end of the cross conveyor and the inversion chute positioned laterally thereof in its operating position, the orientation of FIG. 2 is parallel to the inclined cross conveyor corresponding to lines 2—2 of FIG. 3, the upright wall and supporting structure rearward of the cross conveyor is not shown for purposes of clarity.
Figure 3:
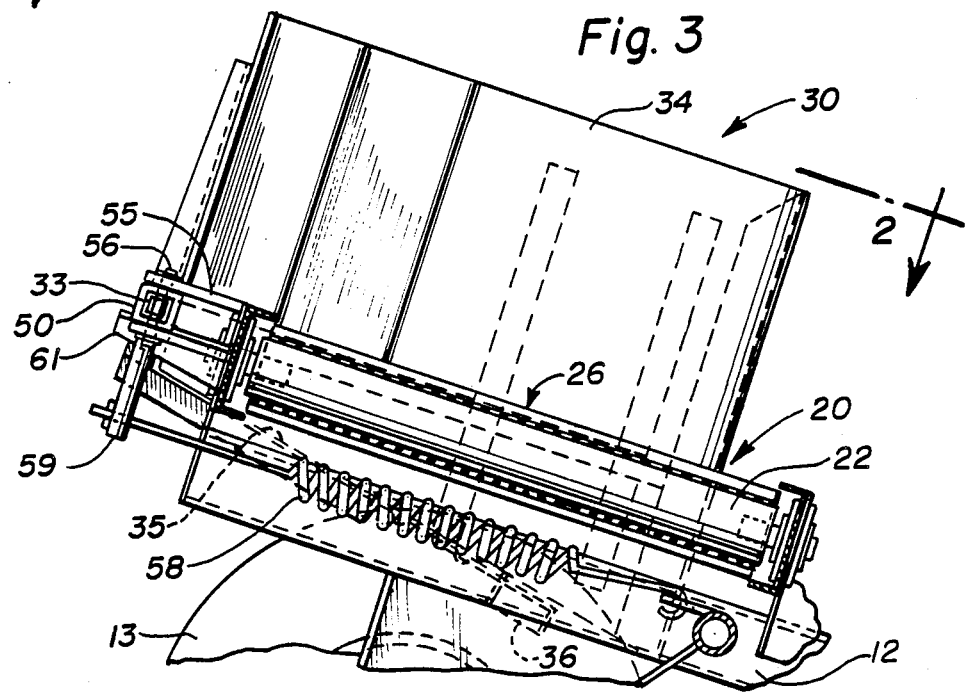
FIG. 3 is a partial vertical cross-sectional view through the cross conveyor corresponding to lines 3—3 of FIG. 2 and depicting an elevational view of the inversion chute.

Referring to FIGS. 1-3, it can be seen that the inner end 42 of the discharge edge 40 is positioned slightly forwardly of the center line 29 of the cross conveyor 20. The outer end 44 of the discharge edge 40 is positioned still forwardly of the inner end 42 resulting in an angular orientation of the discharge edge 40 with respect to the center line 29 of the cross conveyor 20. It should be noted, however, that the exact orientation of the discharge edge 40 can be varied by manipulation of the position of the edge plate member 36 relative to the floor 35 to which it is attached, thereby permitting an adjustment of the discharge edge 40 of the inversion chute 30 to correspond to differing crop conditions as desired by the operator. Nevertheless, the most complete inversion of the windrow will be obtained when the outer end 4 of the discharge edge 40 is positioned forwardly of the inner end 42.

The mounting arm 33 of the inversion chute subframe 32 is telescopically received within a mounting sleeve 50 having a plurality of apertures 52 extending therethrough. A pin or bolt 53 extending through one of the apertures 52 and a corresponding hole within the mounting arm 33 will lock the positional movement of the mounting arm 33 from within the mounting sleeve 50. The corresponding telescopic movement of the inversion chute 30 is shown in FIG. 1 in phantom. Since the orientation of the mounting sleeve 50, when the inversion chute 30 is in its operating position, is parallel to the center line 29 of the cross conveyor 20, the telescopic movement of the inversion chute 30 maintains the selected angular relationship between the orientation of the discharge edge 40 and the centerline 29 of the cross conveyor 20 throughout the entire range of telescopic movement of the inversion chute 30.

The mounting sleeve 50 is pivotally connected to a mounting bracket 55 by a pivot 56 to permit the sleeve 50 to pivotally rotate approximately 180° to move the location of the inversion chute 30 from an operating position outboard of the cross conveyor 20, as shown in solid lines in FIGS. 1 and 2, to a transport position rearwardly of the pickup 15 and cross conveyor 20 as shown in phantom in FIG. 1. An overcenter spring 58 interconnecting the frame 12 and a downwardly extending pin 59 affixed to the sleeve 50, to permit the spring 58 to clear the pivot 56, urges the mounting sleeve 50 and attached inversion chute 30 into whichever position the inversion chute 30 is placed.

A pair of support brackets 61 positioned on either side of the mounting bracket 55 and provided with a stop 63 restricts the amount of movement permitted to the mounting sleeve 50 toward the cross conveyor. One skilled in the art will readily realize that other alternatives to the stop 63 could include a pin connector or a spring clip to more positively fix the position of the mounting sleeve 50 relative to the support brackets 61. Utilization of the stop 63 or a corresponding spring clip would permit the inversion chute 30 to swing from its operating position toward its transport position upon impact thereof with an obstacle. Alternatively, the bolt 53 could be removed from the mounting sleeve 50 and mounting arm 33 to permit the mounting arm 53 to be extracted completely from the sleeve 50. A reengagement of the mounting arm 33 with a transport sleeve 65 mounted on a forward portion of the frame 12 would permit the inversion chute 30 to be carried in an alternative transport position forwardly of the pickup 15, thereby minimizing both the overall width and the overall length of the windrow turner 10.

In operation, a windrow elevated by the pickup mechanism 15 and conveyed laterally by the cross conveyor 20 into the inversion chute 30 will be engaged by the upright diversion wall 34 and redirected into a forward orientation over the floor base member 35 and across the discharge edge 40, whereupon the windrow is discharged to the ground and inverted by the forward motion of the windrow turner 10. The angular orientation of the discharge edge 40, with the outer end 44 forwardly of the inner end 42, effects a complete inversion of the windrow such that the entire damp side of the windrow which was on the bottom adjacent the ground prior to being elevated by the pickup mechanism 15 is positioned completely on top of the windrow after being discharged from the inversion chute 30. Furthermore, the shape of the discharged windrow will be substantially the same as it was originally prior to engagement with the pickup mechanism 15, except for perhaps a little fluffing, thereby permitting a proper flow of air therethrough to facilitate drying. The exact orientation of the discharge edge 40 can be manipulated by pivotally moving the edge plate member 36 relative to the floor base member 35 to which it is mounted.

The location of the inner end 42 of the discharge edge 40 just forwardly of the center line 29 of the cross conveyor 20 causes the forward edge of the windrow being conveyed laterally by the cross conveyor 20 to fall toward the ground while the rearward edge is supported by the floor base member 35 and edge plate member 36 and turned into a forward orientation by the diversion wall 34. Since a windrow of crop material comprises a mass of intertwined plants, the windrow is moved as a solitary mass by the inversion chute 30, thereby securing and facilitating the inversion of the windrow. The lateral orientation of the inversion chute 30 with respect to the discharge end 26 of the cross conveyor 20 can also be varied to accommodate windrows of different thicknesses by manipulating the telescopic movement of the mounting arm 33 from within the mounting sleeve 50. An overcenter spring 58 urges the inversion chute 30 against the stop or clip 63 to maintain the inversion chute in its operating position. Rotation of the inversion chute 30 about its pivotal mounting 56 affects a repositioning of the inversion chute 30 into its transport position which again is retained against a stop 63 by the force exerted by the overcenter spring 58.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment; however, concepts, as based upon the description may be employed in other embodiments without departing from the scope of the invention. Accordingly, the following claims are intended to protect the invention broadly, as well as in the specific form shown.

Having thus described the invention, what is claimed is:

1. In a machine for inverting and displacing windrows of crop material, said machine having a frame; a pick-up mechanism mounted on said frame to elevate a windrow of crop material lying on the ground in a first orientation along a first path with a dry side above a damp side; a conveyor to receive said elevated windrow of crop material from said pickup mechanism and convey said elevated windrow to a discharge end laterally of said first path to permit said windrow to be deposited on the ground in a second path transversely spaced from said first path; and drive means for operatively powering said pick-up mechanism and said conveyor, the improvement comprising:
an inversion chute supported by said frame adjacent said discharge end of said conveyor to receive said windrow of crop material from said conveyor, invert said windrow, and deposit said windrow on the ground in said second path in a second orientation with said damp side being above said dry side, said inversion chute being movably positionable relative to said discharge end of said conveyor to accommodate varying sizes of windrows of crop material.

2. The machine of claim 1 wherein said inversion chute includes an arm telescopically receivable within a sleeve mounted on said frame and locking means engageable with said sleeve and said arm to positionally fix the position of said arm relative to said sleeve, thereby fixing the position of said inversion chute relative to said discharge end of said conveyor.

3. The machine of claim 2 wherein said inversion chute further includes a floor supported by a subframe and a diversion wall extending upwardly from said floor on two sides thereof, said floor terminating in a generally transversely extending forward discharge edge over which said windrow of crop material passes to be deposited on the ground.

4. The machine of claim 3 wherein said inversion chute is selectively detachable from said frame by disengaging said telescopic arm from said sleeve to reduce the overall width of said machine during a non-operative transport thereof.

5. The machine of claim 1 wherein said inversion chute includes a subframe pivotally supported by said frame through a pivot assembly to permit pivotal movement of said inversion chute about a generally vertical axis.

6. The machine of claim 5 wherein said inversion chute is pivotally movable between an operative position transversely of said discharge end of said conveyor and a transport position longitudinally rearwardly of said conveyor.

7. The machine of claim 6 wherein said inversion chute also includes retaining means to fix said inversion chute in a selected position.

8. The machine of claim 7 wherein said subframe of said inversion chute includes an arm telescopically received within a sleeve forming part of said pivot assembly, the telescopic movement of said arm relative to said sleeve effecting an adjustable movement of said inversion chute relative to the discharge end of said conveyor to accommodate varying sizes of said windrows.

9. The machine of claim 8 wherein said retaining means includes an overcenter spring connected to said pivot assembly to restrain said inversion chute in the selected position.

10. An inversion chute for use on a windrow inverter having a frame, a pick-up mechanism for elevating a windrow of crop material from the ground in a first orientation with a dry side being above a damp side, and a cross conveyor for receiving an elevated windrow from said pick-up mechanism and conveying said windrow in a lateral direction in a first orientation to a discharge end, comprising:
a subframe including a transversely extending arm telescopically received within a sleeve supported by said windrow inverter frame;
a floor member supported by said subframe adjacent to and below said cross conveyor to receive said windrow of crop material from the discharge end of said cross conveyor, said floor member having a forward transversely extending discharge edge; and
a diversion wall extending upwardly from a rearward and an outboard side of said floor member to change the direction of movement of said windrow from a lateral direction to a forwardly extending direction toward the discharge edge of said floor member, the telescopic movement of said arm relative to said sleeve effecting a transverse movement of said diversion wall and floor member relative to said discharge end of said cross conveyor to accommodate varying sizes of said windrows.

11. The inversion chute of claim 10 wherein said sleeve is part of a pivot assembly pivotally connecting said inversion chute to said windrow inverter frame for pivotal movement of said inversion chute about a generally vertically extending axis.

12. The inversion chute of claim 11 wherein said inversion chute is pivotally movable between an operative position outboard of the discharge end of said cross conveyor and a transport position rearwardly of said cross conveyor.

13. The inversion chute of claim 12 wherein the telescopic movement of said arm effects a transverse movement of said inversion chute parallel to said discharge end of said cross conveyor thereby maintaining the angular relationship between said discharge edge and the orientation of said discharge end.

* * * * *

UNITED STATES PATENT AND TRADEMARK OFFICE
CERTIFICATE OF CORRECTION

PATENT NO.   : 4,793,129

DATED        : December 27, 1988

INVENTOR(S)  : Philip J. Ehrhart, et al

It is certified that error appears in the above-identified patent and that said Letters Patent is hereby corrected as shown below:

Cover page, in the first column where the inventors and their residences are identified, after "Ernest A. Schoeneberger, New Holland, PA." insert the following --James A. Martin, Lancaster, PA.--

Signed and Sealed this

Second Day of May, 1989

Attest:

DONALD J. QUIGG

Attesting Officer

Commissioner of Patents and Trademarks